United States Patent [19]

Taki et al.

[11] Patent Number: 5,094,315
[45] Date of Patent: Mar. 10, 1992

[54] FUEL TANK ARRANGEMENT FOR SCOOTER

[75] Inventors: Norio Taki; Hiroyuki Aoki, both of Iwata, Japan

[73] Assignee: Yamaha Hatsudoki Kabushiki Kaisha, Iwata, Japan

[21] Appl. No.: 541,840

[22] Filed: Jun. 21, 1990

[30] Foreign Application Priority Data

Jun. 22, 1989 [JP] Japan .................... 1-161817

[51] Int. Cl.⁵ .............................. B62J 35/00
[52] U.S. Cl. ........................... 180/219; 220/564;
224/32 R; 280/835; 296/97.22; 297/193; 297/243
[58] Field of Search .......... 180/219, 225; 280/202, 280/288.4, 835; 296/97.22, 64; 220/23.86, 555, 563, 564; 224/32 R, 275; 297/193, 214, 243, DIG. 9

[56] References Cited

U.S. PATENT DOCUMENTS

| 4,413,700 | 11/1983 | Shiratsuchi | 280/288.4 |
| 4,679,647 | 7/1987 | Komuro | 180/219 |
| 4,811,984 | 3/1989 | Hempel | 296/97.22 |

FOREIGN PATENT DOCUMENTS

| 10005 | 4/1980 | European Pat. Off. | 296/97.22 |
| 516776 | 2/1955 | Italy | 180/225 |
| 51-44532 | 10/1976 | Japan | |
| 156422 | 9/1983 | Japan | 296/97.22 |
| 58-179289 | 11/1983 | Japan | |
| 59-154480 | 10/1984 | Japan | |
| 61-191488 | 8/1986 | Japan | |
| 52-152990 | 7/1987 | Japan | |
| 63-50787 | 4/1988 | Japan | |
| 82823 | 4/1988 | Japan | 296/97.22 |
| 819690 | 9/1959 | United Kingdom | 180/225 |

*Primary Examiner*—Mitchell J. Hill
*Attorney, Agent, or Firm*—Ernest A. Beutler

[57] ABSTRACT

A scooter having an improved seat, fuel tank and storage compartment arrangement. The seat is divided into a front portion and a rear portion with the rear portion being hinged and affording access to a storage compartment positioned beneath it with the opening closed by the rear seat portion being inclined at an acute angle to the horizontal. A fuel tank is positioned beneath the front seat and has a fill neck which is accessible through an opening at the side of the seat. This opening is closed by a closure member that is moveable between a closed position and an opened position. Either directly or remotely positioned latching arrangements are disclosed for the closure member.

11 Claims, 7 Drawing Sheets

FUEL TANK ARRANGEMENT FOR SCOOTER

BACKGROUND OF THE INVENTION

This invention relates to a fuel tank arrangement for a scooter and more particularly to an improved placement for a fuel tank and its filler nozzle in a motor scooter.

As is well known, motorized two wheel vehicles are extremely compact in their nature. This is particularly true of a small type of two wheel vehicle commonly known as a motor scooter. Such devices are extremely compact and have high practicality because of their small size. However, their small size gives rise to certain problems in connection with the layout and accessing of various components. For example, it is desirable to provide a large capacity fuel tank for such vehicles so that the operator need not fuel the vehicle very often. However, it has heretofore been quite difficult to provide a large capacity fuel tank and also one in which the fill nozzle can be conveniently accessed. Although frequently the fuel tank is positioned beneath the seat of the scooter, either the seat must be pivotal for accessing the fuel tank or the fuel filler neck is located in an awkward position.

It is, therefore, a principal object of this invention to provide an improved fuel tank arrangement for a motor scooter.

It is a further object of this invention to provide a fuel tank arrangement for a motor scooter offering ease of access of the filler nozzle.

It is a still further object of this invention to provide a fuel tank arrangement for a motor scooter wherein the fuel tank is positioned beneath the scooter seat but the seat need not be moved in order to access the filler neck of the tank.

SUMMARY OF THE INVENTION

The invention is adapted to be embodied in a motorized two wheel vehicle having a frame, a front wheel dirigibly supported at the front end of the frame and a rear wheel journaled at the rear of the frame. An engine is carried by the frame and transmission means drive at least one of the wheels from the engine. A seat is carried by the frame and a fuel tank is also carried by the frame and is positioned at least in part beneath and is at least partially concealed by the seat. The fuel tank has a fill neck.

In accordance with a first feature of the invention, an opening is formed in the seat for access of the fill neck without removal or moving of the seat.

In accordance with another feature of the invention, a closure member is movably supported relative to the opening between an opened and a closed position and a remotely operated latch is provided for holding the closure member in its closed position.

DETAILED DESCRIPTION OF THE PREFERRED EMBODIMENTS OF THE INVENTION

Figure 1:
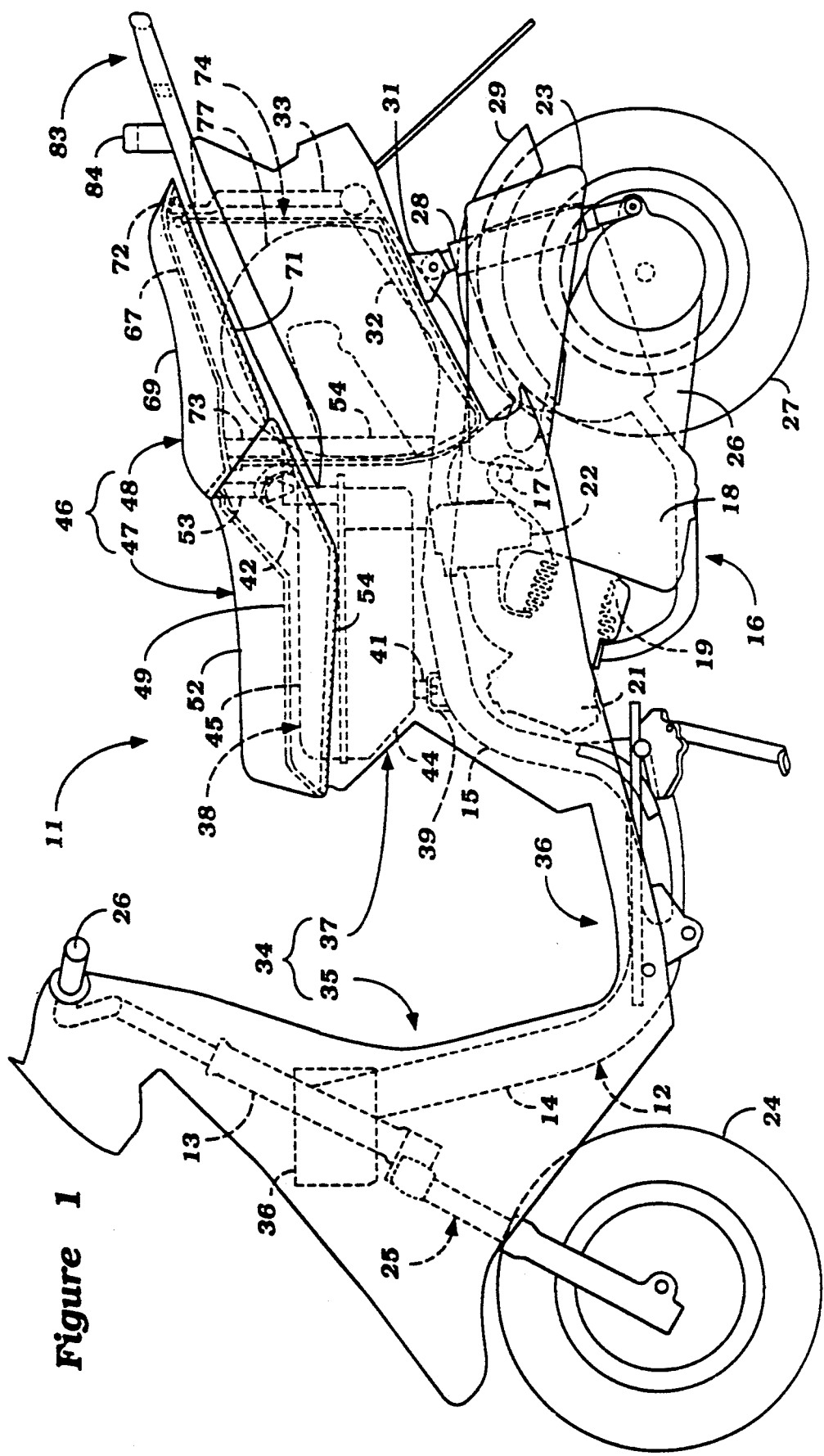
FIG. 1 is a side elevational view of a motor scooter constructed in accordance with a first embodiment of the invention.
Figure 2:
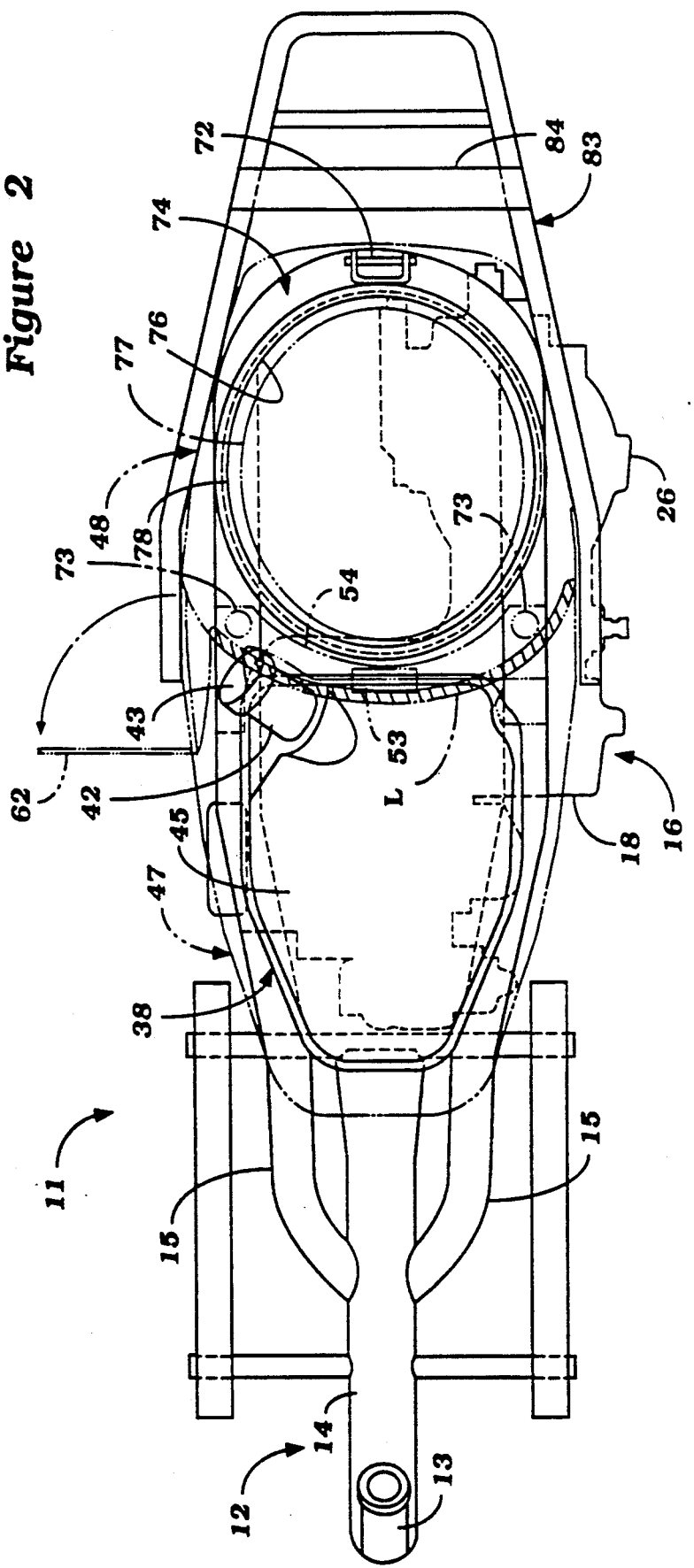
FIG. 2 is a top plan view of the motor scooter with portions of the body removed and other portions broken away and shown in section.

Referring first to the embodiment of FIGS. 1 through 7, a motor scooter constructed in accordance with this embodiment is identified generally by the reference numeral 11. The motor scooter 11 includes a frame assembly, indicated generally by the reference numeral 12 and which is comprised of a head pipe 13 to which a main tube 14 having a goose neck configuration is affixed, as by welding. A pair of side tubes 15 are affixed at their forward ends, as by welding, to the lower central portion of the main tube 14 and curve upwardly and extend rearwardly.

A power unit, indicated generally by the reference numeral 16 is supported beneath these frame members 15 on a pivot bolt 17. The power unit 16 includes an internal combustion engine having a combined crankcase transmission assembly 18 and one or more forwardly inclined cylinders 19. A cylinder head assembly 21 is affixed to the cylinder block 19 in a known manner.

The engine of the power unit 16 is provided with an induction system that includes a carburetor 22 that draws air through a side and rearwardly positioned air cleaner silencer assembly 23. Since the construction of the power unit 16 per se forms no part of the invention, a further description of it is believed to be unnecessary to permit those skilled in the art to understand the construction and operation of the invention.

A front wheel 24 is rotatably journaled in a suitable manner at the lower end of a front fork 25. The front fork 25 is, in turn, dirigibly supported by the head tube 13 in a known manner and carries a pair of handlebars 26 at its upper end by which the front wheel 24 may be steered.

The engine crankcase transmission assembly 18 drives a variable belt transmission contained within a casing 26 which, in turn, drives a rear wheel 27 that is journaled for rotation by this casing 26. It has been previously noted that the power unit 16 is pivotally mounted on the frame assembly 12 by means of the pivot pin 17. This pivotal movement is restrained by a pair of combined spring and shock absorber assemblies 28 that are interposed between the casing 26 and the frame assembly 12 for suspension travel of the rear wheel 27. A fender 29 is affixed to the casing 26 and thus travels with the wheel 27 during its suspension movement.

Each combined spring shock absorber assembly 28 is fixed at its upper end by means of a bracket 31 to frame member 32 that extends at each side back from the frame members 15. An upstanding frame member 33 extends from the rear ends of the frame members 32.

A body cover, indicated generally by the reference numeral 34 encloses at least in part the frame assembly 12 and some of the running components thus far described. This body cover 34 includes a front portion 35 that encloses a battery 36 carried by the front of the frame assembly 12, the head pipe 13 and a portion of the front fork 25. This portion 35 also forms a leg shield for the feet of a rider which can be positioned on a platform 36 formed at the rear end of the portion 35. The body cover 34 also includes a rear portion 37 that encloses the frame members 15 and a portion of the power unit 16.

A fuel tank 38 is carried by the frame assembly 12 and specifically by the frame members 15 on brackets 39 and elastic isolators 41. The fuel tank 38 extends over the power unit 16 and specifically its forward end and has a rearwardly and sidewardly disposed filler neck 42 to which a detachable cap 43 is affixed. As may be best seen in FIG. 6, the fuel tank 38 is formed from a pair of sheet metal stampings including a lower member 44 and an upper member 45 that are connected to each other by means of peripheral flanges. The filler neck 42 is connected to the upper member 45.

Figure 3:
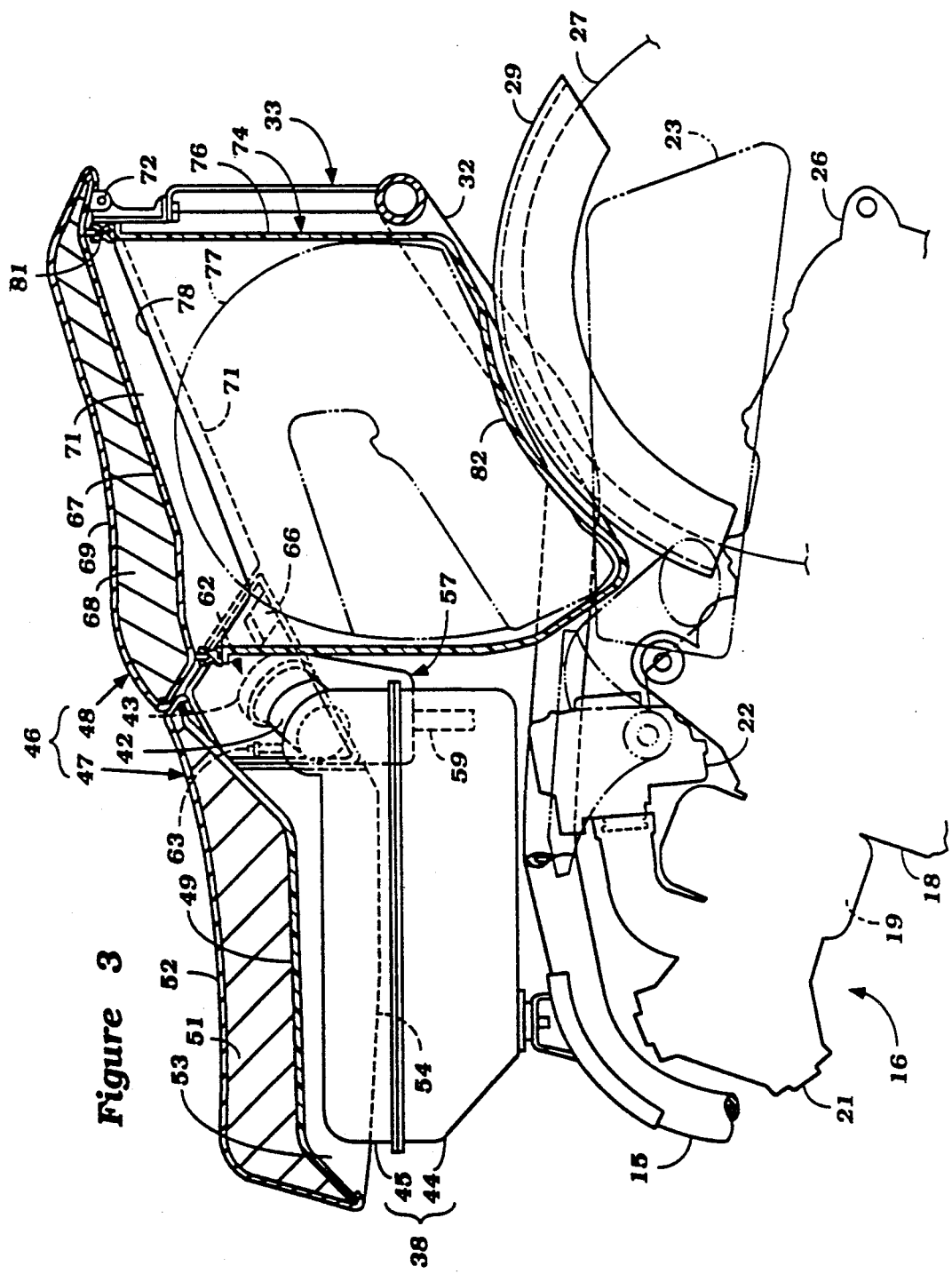
FIG. 3 is an enlarge side elevational view of the seat portion of the scooter and adjacent components, with certain portions shown in section and portions broken away.
Figure 4:
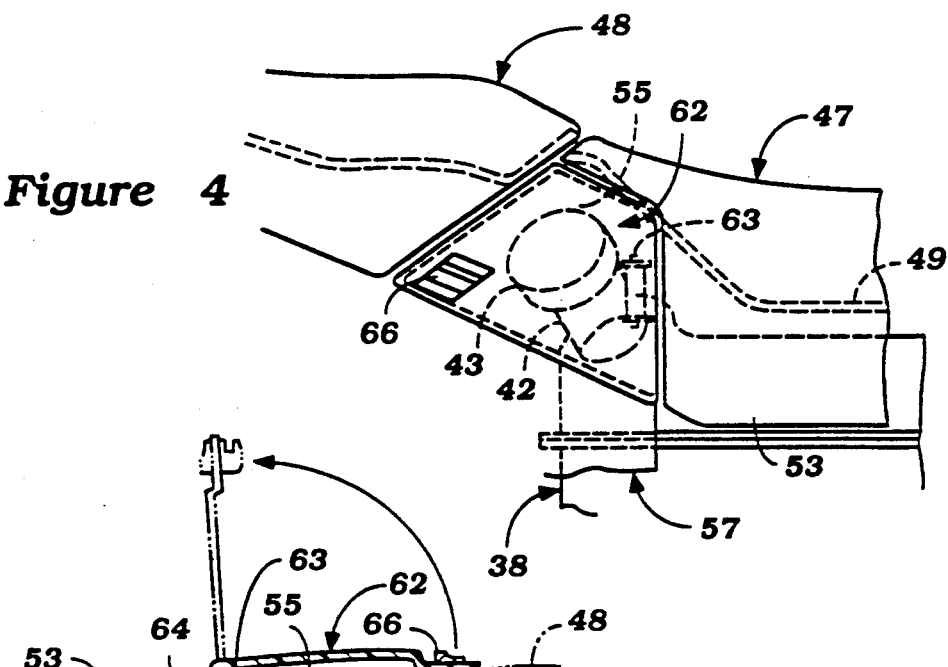
FIG. 4 is a partial side elevational view, looking from the side opposite that of FIGS. 1 and 3.
Figure 5:
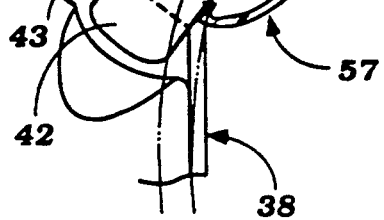
FIG. 5 is a top plan view, with portions shown in section, showing the filler neck for the fuel tank and the associated closure member therefor.
Figure 6:
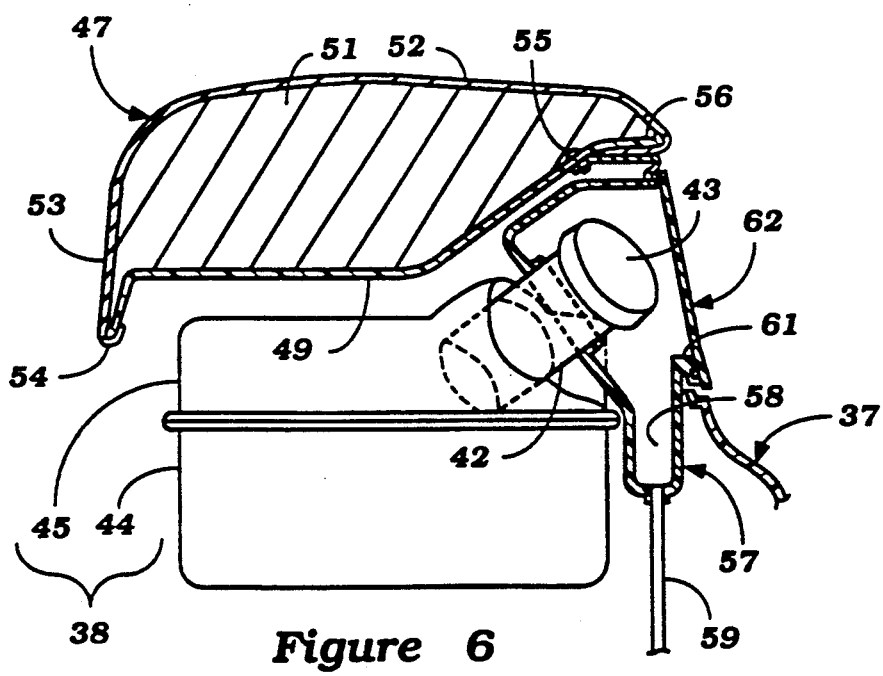
FIG. 6 is a cross sectional view taken along a vertically extending plane and looking from the rear of the scooter in the area of the fill neck for the fuel tank.

A seat assembly, indicated generally by the reference numeral 46 is mounted on the frame assembly 12, in a manner to be described, for accommodating an operator and, if desired, a single passenger. This seat 46 is of a two piece construction and includes a front portion 47 and a rear portion 48. Referring in detail primarily to FIGS. 3 and 6, the front seat portion 47 is disposed immediately behind the foot area 36 and has sufficient length so as to accommodate not only the operator but also so as to fully overlie the fuel tank 38. The seat portion 47 is comprised of a relatively rigid backing piece 49 to which a foam or other cushion stuffing material 51 is affixed. A covering 52 overlies this cushioning 51 and has downwardly depending skirt portions 53 that terminate in flaps 54 that are affixed to the backing 49 in a suitable manner, as by an adhesive. A seat lock 53 depends from the seat 47 and specifically the backing piece 49 and is interlocked into openings (not shown) in a bracket that is affixed to an upstanding frame member 54 so as to detachably affix the front seat portion 47 to the frame 12.

It should be noted that the side portions 53 of the front seat 47 overlie the sides of the top part 45 of the fuel tank 38 and conceal the portion of it which is not concealed by the body cover part 37. However, to afford access to the fill neck 42, a cut out 55 is formed at the rear of the seat 47 and at the one side where the fill neck 42 is located. This cut out 55 shows in most detail in FIGS. 4 through 6. A plate 56 is affixed to the lower portion of the seat backing piece 49 adjacent the cut out 55 and carries an overflow receptacle 57 that has a trap portion 58 which, in turn, will receive any fuel that may overflow the filler neck 42. This accumulated fuel is then drained through a drain tube 59 which terminates at a low portion in the scooter 11 and preferably at a point below the cylinder block 19.

The receptacle 57 further defines an opening 61 that is generally coextensive with the cut out 55. A closure member 62 is provided for selectively closing the opening 61 and cut out 55 when fuel is not being added. The closure member 62 is pivotally journaled for movement between its closed and open positions by means of a hinge assembly 63 which, in turn, is connected to a plate 64 that is affixed to the leading side of the receptacle 57. A keeper 65 is affixed to the opposite edge of the receptacle 57 on the opposite side of the opening 61 and a slidable latch member 66 carried by the closure 62 cooperates with the keeper 65 so as to hold the closure 62 in its closed position as shown in the figures. When the latch 66 is released, the closure 62 may be pivoted to an open position as shown in phantom in FIG. 5 for accessing the fill neck 42 and cap 43.

Figure 7:
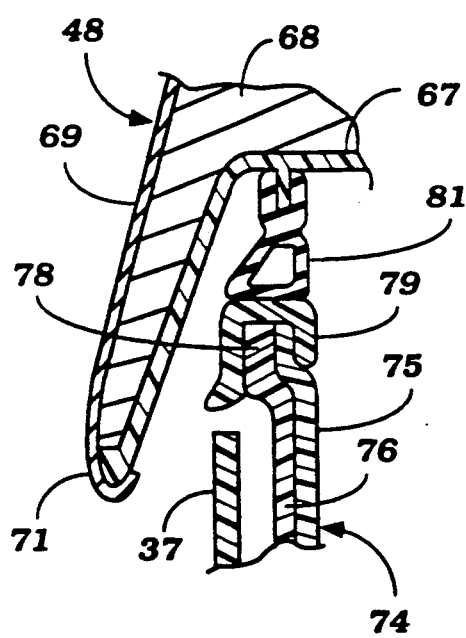
FIG. 7 is a cross sectional view showing the sealing relationship between the rear seat portion and the storage compartment.

As may be best seen in FIGS. 1, 3 and 7, the rear seat portion 48 has a construction generally similar to that of the front seat portion 47, although the configuration is different. That is, the rear seat portion 48 is comprised of a lower backing piece 67 to which a padding material 68 such as a foamed plastic is affixed. A covering 69 having side portions 71 overlies the cushioning material 68 and has flaps 71 that overlie and are affixed to the backing piece 67 in a suitable manner. As should be noted from FIG. 2, the forward edge of the rear seat 68 is curved and fits into a curved recess formed in the rear portion of the front seat 47 so that when the seat portions 47 and 48 are in their normal position, it provides a neat and continuous appearing surface. This curvature is shown by the line L in FIG. 2.

The rear seat portion 48 is pivotally connected to the frame assembly 12 by means of a hinge assembly 72 that is affixed to the upper end of the frame member 33. In its normal closed position, the front of the seat 48 is supported on the frame member 54 by means of a pair of elastic stops 73 (FIGS. 1 and 3). The reason for pivotally supporting the rear seat 48 is that it provides a closure for a carrier receptacle, indicated generally by the reference numeral 74 and which is positioned therebeneath within the body covering portion 37. The receptacle 74 may be formed from a rigid plastic and has a double wall construction comprised of an inner member 75 and an outer member 76 (FIG. 7). These members define a cavity which is configured so as to accept an article such as a rider's helmet 77 as shown in phantom in the figures. The members 75 and 76 define an upstanding wall having an opening at its upper end that is defined by a flange 78 (FIG. 8) to which a sealing gasket 79 is affixed. The gasket 79 is adapted to be engaged by a corresponding gasket 81 affixed to the underside of the seat backing member 67 so as to provide a watertight seal for its internal cavity.

It should be noted that the opening 78 is inclined to the horizontal so as to provide a relatively large opening even though the seat portion 48 has a relatively short length. In addition, the lower wall of the enclosure 74 has a somewhat dome shaped configuration, as indicated at 82 in FIG. 3 so as to afford clearance for the suspension movement of the rear fender 29. A grab rail 83 having a cross piece 84 is affixed to the rear body covering portion 37 so as to provide a gripping area for a passenger seated on the rear seat 48.

Figure 8:
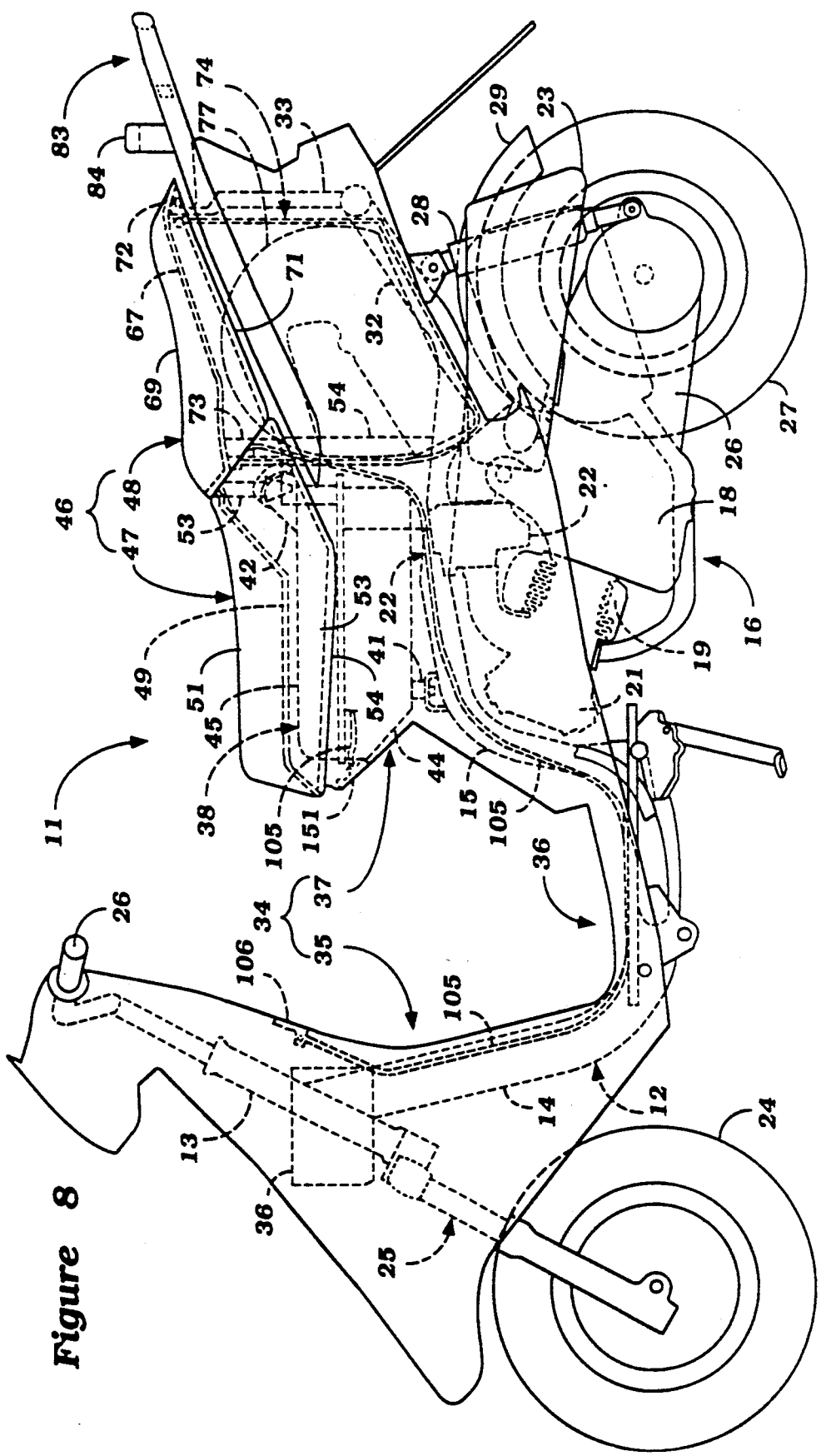
FIG. 8 is a side elevational view, in part similar to FIG. 1, and shows another embodiment of the invention.
Figure 9:
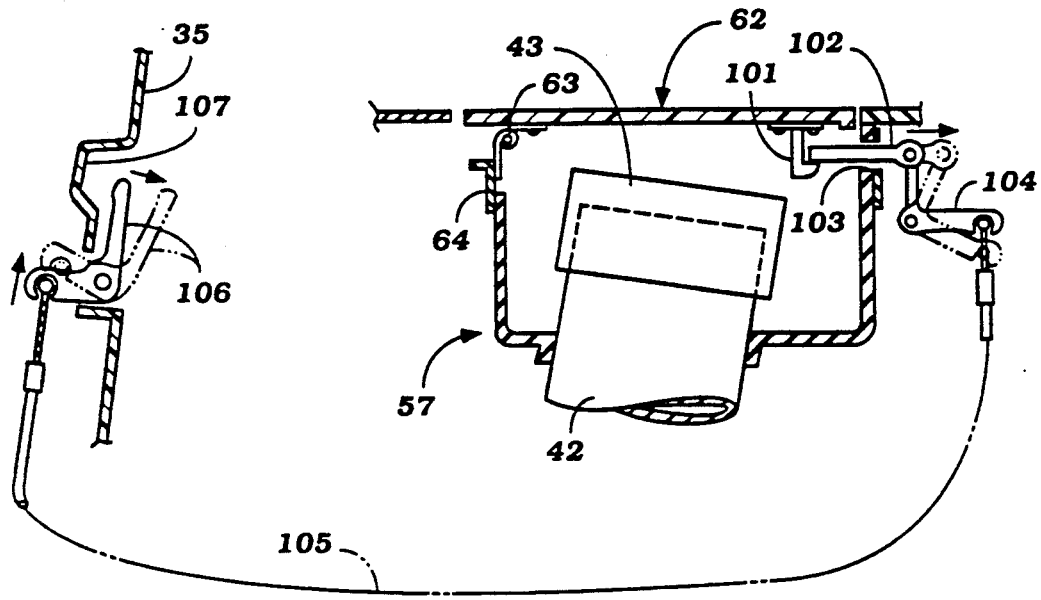
FIG. 9 is an enlarged partially schematic cross sectional view showing the remote control operation for the closure member associated with the filler neck in this embodiment.

In the embodiment of the invention as thus far described, the closure member for accessing the filler neck 42 was provided with a slidable latch assembly 66 that is directly operated. Although this has the convenience of easy operation, in some instances it may be desirable to provide a remote latching arrangement. FIGS. 8 and 9 show one such embodiment. This embodiment is, except for the latching mechanism and its operator, the same as the embodiment of FIGS. 1 through 7 and, for that reason, components which are the same as the previously described embodiment have been identified by the same reference numerals and will not be described again.

In this embodiment, a fixed keeper member 101 is affixed to the inner end of the closure member 62 in the area where the latch 66 of the previous embodiment was positioned. A slidable plunger 102 is received within and supported by a plate 103 that is affixed to the receptacle 57 and which is connected to one arm of a bell crank 104. The bell crank 104 is pivoted from its latched position as shown in FIG. 9 to its released position as shown in phantom lines in this figure by a bowden wire cable 105.

The bowden wire cable 105 extends through the frame assembly along the frame tubes as shown in FIG. 8 to a pivotally supported operator 106 that is contained within a recess 107 formed at an upper portion of the body portion 35. As a result, an operator can reach forwardly and release the closure member 62 while seated upon the seat. If desired, the hinge 63 may incorporate an integral spring assembly so that the closure member 62 will swing to its opened position when the sliding latch 102 is actuated.

Figure 10:
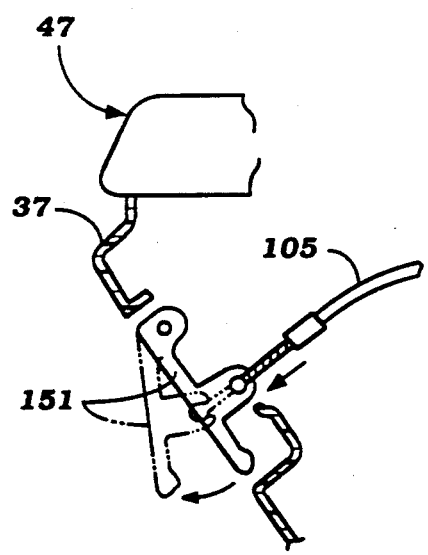
FIG. 10 is a cross sectional view taken through the front of the front portion of the seat and shows yet another embodiment of remote control release for the filler neck closure.

Alternatively to positioning the operator 106 at the front of the rider's area, a similar latch operator 151 may be mounted at the rear of the rider's area on the body portion 37 immediately beneath the front edge of the seat 47 as shown in FIG. 10 and in the alternative phantom line view in FIG. 8. Other locations obviously can be employed for the operator of the closure member latch.

In each of the embodiments as thus far described, the closure member 62 for the opening to access the fill neck 42 has been provided in addition to the cap 43 for the fill neck. It should be understood that, if desired, the fill neck cap 43 can be deleted and a closure for the fill neck 42 can be carried directly by the closure door 62. If this is done, the arrangement should be obviously resilient so that the cap carried by the closure member 62 can form a good sealing relationship with the fill neck 42 when the closure 62 is in its closed position.

It should be readily apparent from the foregoing description that the described embodiments of the invention provide an adequate fuel tank capacity and a fuel filler neck location that can be easily accessed and which will not necessitate pivotal movement of a heavy seat portion. Furthermore, the design provides a neat appearance and the closure for the filler neck opening may be either directly or remotely operated. Although a number of embodiments of the invention have been illustrated and described, various changes and modifications may be made without departing from the spirit and scope of the invention, as defined by the appended claims.

We claim:

1. A motorized two wheeled vehicle having a frame, a front wheel dirigibly supported at the front of said frame, a rear wheel journaled at the rear of said frame, an engine carried by said frame, transmission means for driving at least one of said wheels from said engine, a seat carried by said frame and having substantially continuous substantially horizontal seating surface and side surfaces, a fuel tank carried by said frame and positioned at least in part beneath and at least partially concealed by said seat, a fill neck extending toward a side of said vehicle for said fuel tank, and an opening in one of said seat side surfaces for accessing said fill neck.

2. A motorized two wheeled vehicle as set forth in claim 1 wherein said seat is divided into separate forward and rearward portions, seating respectively a driver and a passenger.

3. A motorized two wheeled vehicle as set forth in claim 2 wherein the fill neck is disposed adjacent the juncture between the seat portions and the opening is formed in the side surface of the forwardmost seat portion.

4. A motorized two wheeled vehicle as set forth in claim 3 further including a storage compartment positioned beneath the rearwardmost seat portion.

5. A motorized two wheeled vehicle as set forth in claim 4 wherein the rearwardmost seat portion is hinged relative to the forwardmost seat portion for providing an opening for access to the storage compartment.

6. A motorized two wheeled vehicle as set forth in claim 5 wherein the opening affording access to the storage compartment formed when the rearwardmost seat portion is opened is inclined at an acute angle to the horizontal.

7. A motorized two wheeled vehicle as set forth in claim 6 wherein the juncture between the forwardmost and rearwardmost seat portions is curved in top plan view.

8. A motorized two wheeled vehicle as set forth in claim 1 further including a moveable closure member for closing said opening and moveable between a closed position and an opened position and including latching means for holding said closure member in its closed position.

9. A motorized two wheeled vehicle as set forth in claim 8 further including a remotely positioned operator for releasing said latch and permitting the closure to be opened.

10. A motorized two wheeled vehicle as set forth in claim 9 wherein the operator is positioned in proximity to the seat of the vehicle.

11. A motorized two wheeled vehicle as set forth in claim 10 wherein the operator is positioned in the foot area of the vehicle.

* * * * *